(12) United States Patent
Ronan et al.

(10) Patent No.: US 8,791,042 B2
(45) Date of Patent: Jul. 29, 2014

(54) PROCESS FOR THE PREPARATION OF AN UNSUPPORTED, SOLID METALLOCENE CATALYST SYSTEM AND ITS USE IN POLYMERIZATION OF OLEFINS

(75) Inventors: Nicolas Ronan, Helsinki (FI); Peter Denifl, Helsinki (FI)

(73) Assignee: Borealis AG, Vienna (AT)

( * ) Notice: Subject to any disclaimer, the term of this patent is extended or adjusted under 35 U.S.C. 154(b) by 119 days.

(21) Appl. No.: 13/513,450

(22) PCT Filed: Dec. 3, 2010

(86) PCT No.: PCT/EP2010/068783
§ 371 (c)(1),
(2), (4) Date: Aug. 20, 2012

(87) PCT Pub. No.: WO2011/069888
PCT Pub. Date: Jun. 16, 2011

(65) Prior Publication Data
US 2012/0309913 A1  Dec. 6, 2012

(30) Foreign Application Priority Data
Dec. 7, 2009 (EP) .................................. 09178177

(51) Int. Cl.
C08F 4/649 (2006.01)
C08F 4/642 (2006.01)
C08F 4/6592 (2006.01)

(52) U.S. Cl.
USPC ........... 502/109; 502/103; 502/104; 502/107; 502/128; 502/152; 526/144; 526/160; 526/165; 526/943

(58) Field of Classification Search
USPC ................. 502/103, 104, 107, 109, 128, 152; 526/144, 160, 165, 943
See application file for complete search history.

(56) References Cited

FOREIGN PATENT DOCUMENTS

WO   WO 03/051934 A2   6/2003
WO   WO 2006/069733 A1   7/2006

Primary Examiner — Caixia Lu
(74) Attorney, Agent, or Firm — Tarolli, Sundheim, Covell & Tummino LLP

(57) ABSTRACT

Process for the preparation of an unsupported, heterogeneous olefin polymerization catalyst system, comprising an organometallic compound of a transition metal of Group 3 to 10 of the Periodic Table (IUPAC 2007) in the form of solid particles comprising the steps of a) preparing a solution (A) comprising $a_i$) an organometallic compound of a transition metal of Group 3 to 10 of the Periodic Table (IUPAC 2007) or of an actinide or lanthanide, $a_2$) a cocatalyst comprising an element of group 13 of the Periodic Table (IUPAC 2007) and $a_3$) a solvent (A-1), b) preparing a liquid/liquid emulsion system by dispersing the solution (A) in a solvent (B) essentially immiscible with said solution (A) in the presence of a polystyrene-b-fluoro polystyrene copolymer of the formula (I) in which n is a number from 10 to 100, m is a number from 1 to 40, x is a number from 5 to 16, y is a number from 11 to 33, provided that m, n, x and y are selected in a way that the block copolymer is soluble in the solvent B or the solution A in such an extent that a stable emulsion is formed by adding the block copolymer, $b_1$) the solvent (B) constitutes the continuous phase of the emulsion, $b_2$) the solution (A) constitutes in the form of droplets the dispersed phase and $b_3$) the organometallic compound and the cocatalyst are present in the droplets, c) solidifying said dispersed phase to convert said droplets to solid particles and optionally recovering said particles to obtain said catalyst system; an unsupported, heterogeneous olefin polymerization catalyst, obtainable by the process and the use of the catalyst in olefin polymerization.

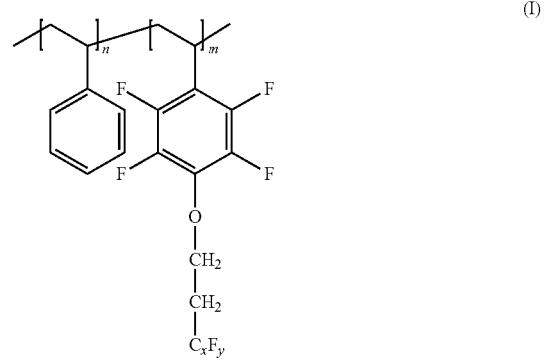

14 Claims, 2 Drawing Sheets

Figure 1:
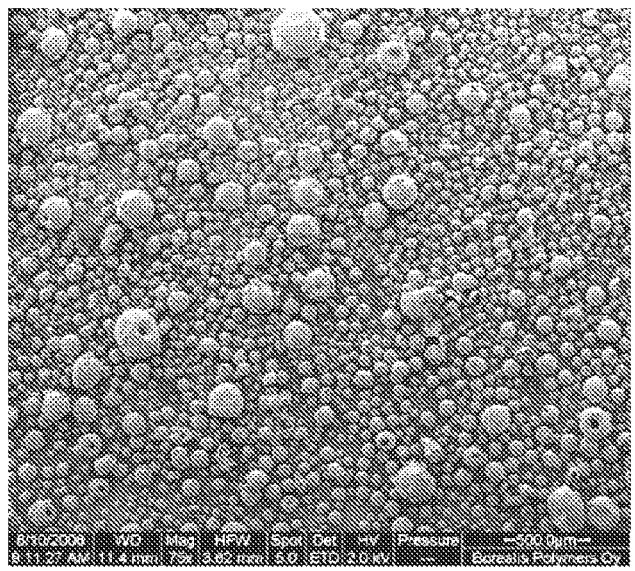
Figure 1:
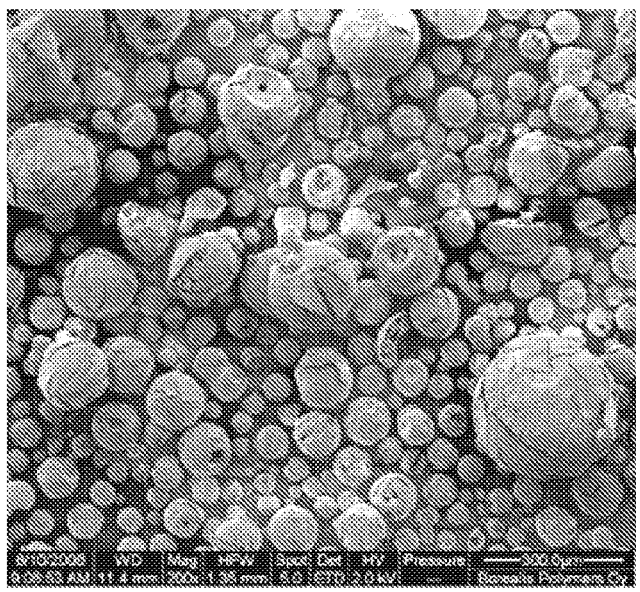

Scanning electron microscopy (SEM) images of the catalyst according to Example 4 are shown Scanning electron microscopy (SEM) images of the catalyst according to Example 5 are shown

PROCESS FOR THE PREPARATION OF AN UNSUPPORTED, SOLID METALLOCENE CATALYST SYSTEM AND ITS USE IN POLYMERIZATION OF OLEFINS

This application corres. to PCT/EP2010/068783, filed Dec. 3, 2010, which claims priority from European Application No. 09178177.3, filed Dec. 7, 2009, the subject matter of which are incorporated herein by reference in their entirety.

This invention relates to an improved process for the preparation of an unsupported, solid metallocene catalyst system with emulsion/solidification technology using polystyrene-b-fluoro polystyrene copolymers as surfactants and to the use of the catalyst system in olefin polymerization.

BACKGROUND ART

Many catalysts and processes are known for the preparation of olefin polymers. Ziegler-Natta (ZN) catalyst compositions and chromium oxide compounds have, for example, been found to be useful in the preparation of polyolefins.

Further the use of metallocene catalysts in olefin polymerization has been known for many years and has been found to afford polymer properties not easily available by using ZN catalysts. Metallocene compounds/procatalysts are conventionally activated using a cocatalyst such as an aluminoxane known from the literature to form the active metallocene catalyst species.

The first single-site catalysts to be developed were homogeneous, i.e. they were used in solution in the polymerization reaction. Due to the many drawbacks of homogeneous solution systems, several different approaches have been used to try to overcome the problems of the solution catalyst systems. Nowadays the widely used catalyst systems comprise heterogeneous catalysts, wherein catalyst components are supported on an external carrier. Such catalyst systems are described for example by Severn et al., Chem. Rev. 2005; 105(11); 4073-4147 or in the Handbook Tailor-Made Polymers: Via Immobilization of Alpha-Olefin Polymerization Catalysts of Severn et al.

The carriers used have a porous structure in order to facilitate catalyst impregnation of the support. Carrier materials are typically polymeric or inorganic supports, most typically silica, alumina or magnesium dichloride based materials.

However, the use of an external support involves additional costs, the quality of the support must be carefully controlled and polymers made using supported catalysts can contain carrier residues which cause some problems.

For example, in film applications this is an important feature, since for polymers made by using such supported catalysts, the carrier residues may be visible in the film.

In recent years solid metallocene catalyst systems, providing the advantages of both homogenous and heterogeneous catalysts, were developed by using an emulsion/solidification technology for their preparation without using an external carrier, as for example disclosed in WO 03/051934 or WO 2006/069733, the contents of which are incorporated herein by reference.

The preparation of this kind of catalyst systems by using an emulsion/solidification technology is based on a liquid/liquid emulsion system comprising at least two phases, whereby the catalyst particles are separated out of the dispersed phase of the emulsion via solidification.

As is disclosed in WO 03/051934 or WO 2006/069733 such a process includes the solidification of droplets, comprising the catalyst particles, dispersed in a continuous phase of an oil-in-fluorous emulsion. In order to obtain such an emulsion, and especially also to preserve the droplet morphology during the solidification step, the use of a surfactant is essential.

According to the description of WO 03/051934 or WO 2006/069733 the surfactant is preferably based on hydrocarbons (including polymeric hydrocarbons with a molecular weight e.g. up to 10 000) optionally interrupted with (a) heteroatom(s), preferably halogenated hydrocarbons optionally having a functional group, preferably semi-, highly- or perfluorinated hydrocarbons as known in the art.

Unfortunately such surfactants are not very effective in stabilizing the emulsion and are furthermore not very suitable to preserve morphology during heating up for the solidification step.

Alternatively and as shown in the Examples, the surfactant are preferably prepared in-situ by reacting a surfactant precursor with a compound of the catalyst solution. Said surfactant precursor may be a halogenated hydrocarbon with at least one functional group, e.g. a highly fluorinated $C_1$ to $C_{30}$ alcohol having at least one functional group selected from —OH, —SH, —NH$_2$, —COOH, —COONH$_2$, oxides of alkenes, oxo-groups and/or any reactive derivative of these groups, which reacts e.g. with a cocatalyst component, such as aluminoxane. Preferred examples are 2,2,3,3,4,4,5,5,6,6,7,7,-dodecafluoroheptanol or 3-perfluorooctyl-1,2-propeneoxide.

Such processes for in-situ formation of the surfactant are difficult to control and therefore result in a mixture of products dependent on the reaction conditions, like reaction time, reaction temperature and concentrations. The formation of different types of compounds is effecting the stability of the emulsion. Even more important is the fact, that it results in the presence of fluoro compounds of varying compositions and concentrations in the catalyst, and, as a consequence, also in the polymer.

In addition, the use of such highly reactive fluorinated compounds is considered problematic from HS&E (Health, Safety & Environment) point of view, so that the availability of these compounds in the future is not guaranteed.

Therefore the need exists to develop improved methods for preparing unsupported, solid metallocene catalyst systems by using the emulsion/solidification technology, which overcome the problems of the catalyst systems according to the state of the art.

It was therefore an object of the invention to provide an improved process for preparing unsupported, solid metallocene catalyst systems by using the emulsion/solidification technology, which avoids the use of highly reactive fluorinated compounds for in-situ surfactant formation and yields catalyst systems having excellent catalytic activity allowing the production of polymers with good polymer particle morphology.

This object was achieved by using a high molecular weight amphiphilic block copolymer, i.e. a polystyrene-b-fluoro polystyrene copolymer, instead of conventional highly reactive fluorinated compounds for emulsion stabilization in a process for preparing unsupported, solid metallocene catalyst systems using the emulsion/solidification technology.

Thus the present invention is therefore directed to an improved process for the preparation of an unsupported, heterogeneous olefin polymerization catalyst system, comprising an organometallic compound of a transition metal of Group 3 to 10 of the Periodic Table (IUPAC 2007) in the form of solid particles comprising the steps of
  a) preparing a solution (A) comprising
    $a_1$) an organometallic compound of a transition metal of Group 3 to 10 of the Periodic Table (IUPAC 2007) or of an actinide or lanthanide,
    $a_2$) a cocatalyst comprising an element of group 13 of the Periodic Table (IUPAC 2007) and
    $a_3$) a solvent (A-1),
  b) preparing a liquid/liquid emulsion system by dispersing the solution (A) in a solvent (B) essentially immiscible with said solution (A) in the presence of a polystyrene-b-fluoro polystyrene copolymer of the formula (I)

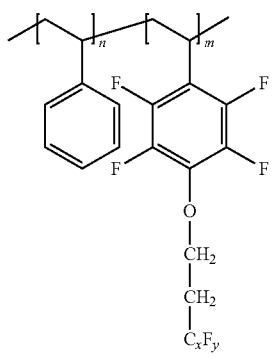

in which n is a number from 10 to 100,
  m is a number from 1 to 40,
  x is a number from 5 to 16,
  y is a number from 11 to 33, provided that m, n, x and y are selected in a way that the block copolymer is soluble in the solvent B or the solution A in such an extent that a stable emulsion is formed by adding the block copolymer,
  $b_1$) the solvent (B) constitutes the continuous phase of the emulsion,
  $b_2$) the solution (A) constitutes in the form of droplets the dispersed phase and
  $b_3$) the organometallic compound and the cocatalyst are present in the droplets,
  c) solidifying said dispersed phase to convert said droplets to solid particles and
  d) optionally recovering said particles to obtain said catalyst system.

Soluble in solvent B or the solution A in such an extent that a stable emulsion is formed by adding the copolymer of the formula (I) is also defined as being sufficiently soluble.

It has been found that polystyrene-b-fluoro polystyrene copolymers of the formula (I) can be used for the stabilization of oil-in-fluorous emulsions during the preparation of such single-site catalyst systems having high catalytic activity.

Compared to the reactive surfactants used so far such copolymers of formula (I) have a defined structure and are chemically inert, which means that no undesired side products are formed even in the presences of highly reactive methyl aluminoxane, which can be used as cocatalyst.

A further advantage of such a copolymer of formula (I) is a decreased tendency of the polymeric surfactant to migrate out or being extracted out of the polymers produced with a catalyst system prepared according to the present invention.

In the following the essential features of the present invention are described in more detail:

The term "solution" throughout the present application indicates that two or more liquid substances are homogenously mixed. At least one of the substances is a solvent in which the other substances (solutes) are dissolved. In the instant invention the solvent of the solution (A) is the solvent (A-1) as defined in more detail below, whereas the solutes of the solution (A) are at least the organometallic compound of a transition metal of Group 3 to 10 of the Periodic Table (IUPAC 2007) and the cocatalyst.

An "emulsion" according to this invention is a mixture of two substances, essentially or almost completely immiscible under the conditions used to form the emulsion. One substance (the dispersed phase) is dispersed in the other (the continuous phase) as droplets. In the present application the continuous phase is the solvent (B) and the dispersed phase (in the form of droplets) is the solution (A) containing the catalyst components.

More precisely, the solvent (A-1) of the present invention is a solvent which dissolves the components of the catalyst system, i.e. at least the organometallic compound of a transition metal of Group 3 to 10 of the Periodic Table (IUPAC 2007) and the cocatalyst. Preferably the solvent (A-1) is an organic solvent (A-1). More preferably the organic solvent (A-1) is selected from the group consisting of a linear alkane, cyclic alkane, linear alkene, cyclic alkene, aromatic hydrocarbon, like toluene, benzene, ethylbenzene, propylbenzene, butylbenzene and/or xylene, and halogen-containing hydrocarbons. Toluene is particular preferred as solvent (A-1) to form the solution (A) with the components of the catalyst system.

The solvent (B) may be a single solvent or a mixture of different solvents and is essentially or almost completely immiscible with the solution (A) at least at the conditions (e.g. temperature) used during the dispersing step b).

Preferably said solvent (B) is inert in relation to the compounds of the catalyst system to be produced. The term "inert in relation to the compounds" means herein that solvent (B) of the continuous phase is chemically inert, i.e. undergoes no chemical reaction with any of the catalyst system forming compound or catalyst system precursor forming compound (e.g. the organometallic compound of a transition metal of Group 3 to 10 of the Periodic Table (IUPAC 2007) and the cocatalyst). Thus, the solid particles of the catalyst system or any precursor thereof are formed in the droplets from the compounds which originate from the dispersed phase, i.e. are provided to the emulsion in the solution (A) dispersed into the continuous phase forming solvent (B).

It is preferred that the catalyst system compounds used for forming the solid catalyst system (e.g. the organometallic compound of a transition metal of Group 3 to 10 of the Periodic Table (IUPAC 2007) and the cocatalyst) are essentially insoluble in said continuous phase forming solvent (B).

Accordingly solvent (B) preferably comprises a halogenated organic solvent, particularly a fluorinated organic solvent and/or a functionalized derivative thereof, still more preferably the immiscible solvent (B) comprises a semi-, highly- or perfluorinated hydrocarbon and/or a functionalized derivative thereof.

As used herein, the phrase "highly fluorinated" refers generally to a compound in which fluorine atoms constitute at least one-half of the non-carbon substituents on the carbon atoms in the molecule. Perfluorinated hydrocarbons refer to those that have all hydrogen atoms on carbon replaced with fluorine.

It is in particular preferred, that said solvent (B) comprises, preferably consists of, a perfluorohydrocarbon or a functionalized derivative thereof, preferably $C_3$-$C_{30}$ perfluoroalkanes, -alkenes or -cycloalkanes, more preferred $C_4$-$C_{10}$ perfluoroalkanes, -alkenes or -cycloalkanes, particularly preferred perfluorohexane, perfluoroheptane, perfluorooctane or perfluoro (dimethylcyclohexane) or a mixture thereof.

These (fluorinated) solvents (B) are chemically inert and very poor solvents for compounds such as for the solvent (A-1) and the catalyst system compounds. Accordingly the reactive compounds (e.g. the organometallic compound of a transition metal of Group 3 to 10 of the Periodic Table (IUPAC 2007) and the cocatalyst) can be kept within the droplet phase so that no relevant reactions in the continuous phase occur, which would worsen the morphology of the solidified catalyst system particles.

Due to the above poor solvent properties of the solvent (B), the "droplet form" of the catalyst system compounds remains even if the solvent (A-1) used initially is removed into solvent (B) during the solidification e.g. by heating the system.

Furthermore it should be noted that the solubility of the catalyst system compounds needs to be low in the mixture of B and A1 even at higher temperatures typically used during the solidification. If this would not be the case then the solidified particles would immediately re-dissolve.

In the present invention a polystyrene-b-fluoro polystyrene copolymer of the formula (I) (described in more detail below) is used as surfactant for forming the emulsion. After the formation of the emulsion system, said catalyst system is formed in situ from the catalyst system compounds, i.e. the organometallic compound of a transition metal of Group 3 to 10 of the Periodic Table (IUPAC 2007) and the cocatalyst, in said solution (A).

In the first step of the process according to the invention a solution of catalyst components is formed.

According to the invention the catalyst components include the organometallic compound of a transition metal of Group 3 to 10 of the Periodic Table (IUPAC 2007) and the cocatalyst.

The term "an organometallic compound of a transition metal" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007).

Accordingly, said organotransition metal compound may have the following formula II:

wherein T is a transition metal as defined above and each A is independently a monovalent anionic ligand, such as a sigma-ligand, each L is independently an organic ligand which coordinates to T, R is a bridging group linking two ligands L, m is 1, 2 or 3, n is 0, 1 or 2, preferably 0 or 1, q is 1, 2 or 3, and m+q is equal to the valency of the metal.

In a more preferred definition, each L is independently (a) a substituted or unsubstituted cyclopentadienyl or a mono-, bi- or multifused derivative of a cyclopentadienyl which optionally bears further substituents and/or one or more hetero ring atoms from a Group 13 to 16 of the Periodic Table (IUPAC); or (b) an acyclic. $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic sigma-, $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

By "sigma-ligand" is meant a group bonded to the metal at one or more places via a sigma bond.

According to a preferred embodiment said organotransition metal compound (I) is a group of compounds known as metallocenes. Said metallocenes bear at least one organic ligand, generally 1, 2 or 3, e.g. 1 or 2, which is $\eta$-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula III:

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR", —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

R is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents); or a bridge of 1-3, e.g. one or two, heteroatoms, such as silicon, germanium and/or oxygen atom(s), e.g. —SiR$^1_2$, wherein each R$^1$ is independently $C_1$-$C_{20}$-alkyl, $C_6$-$C_{20}$-aryl or tri($C_1$-$C_{20}$-alkyl)silyl- residue, such as a trimethylsilyl-residue.

T is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR", —PR"$_3$. —SiR"$_3$, —OSiR"$_3$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

Each of the above mentioned ring moieties alone or as a part of a moiety as the substituent for Cp, X, R" or R$^1$ can further be substituted e.g. with $C_1$-$C_{20}$-alkyl which may contain Si and/or O atoms;

n is 0, 1 or 2, e.g. 0 or 1,
m is 1, 2 or 3, e.g. 1 or 2, q is 1, 2 or 3, e.g. 2 or 3, wherein m+q is equal to the valency of T.

Said metallocenes of the formula (III) and their preparation are well known in the art.

Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula (III), each Cp independently bears one or more substituents selected from $C_1$-$C_{20}$-alkyl, $C_6$-$C_{20}$-aryl, $C_7$-$C_{20}$-arylalkyl (wherein the aryl ring alone or as a part of a further moiety may further be substituted as indicated above), —OSiR"$_3$, wherein R" is as indicated above, preferably $C_1$-$C_{20}$-alkyl; X is H, halogen, $C_1$-$C_{20}$-alkyl, $C_1$-$C_{20}$-alkoxy, $C_6$-$C_{20}$-aryl, $C_7$-$C_{20}$-arylalkenyl or —NR"$_2$ as defined above, e.g. —N($C_1$-$C_{20}$-alkyl)$_2$; R is a methylene, ethylene or a silyl bridge, whereby the silyl can be substituted as defined above, e.g. a dimethylsilyl=, methylphenylsilyl= or trimethylsilylmethylsilyl=bridge; n is 0 or 1; m is 2 and q is two.

Preferably, R" is other than hydrogen.

A specific subgroup includes the well known metallocenes of Zr, Hf and Ti with one or two, e.g. two, η-ligands which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. siloxy, alkyl and/or aryl as defined above, e.g. at 2-, 3-, 4- and/or 7-positions. As specific examples e.g. bis(alkylcyclopentadienyl)Zr (or Ti or Hf) dihalogenides can be mentioned, such as bis(n-butylcyclopentadienyl)ZrCl$_2$ and bis(n-butylcyclopentadienyl)HfCl$_2$, see e.g. EP-A-129 368. Examples of compounds wherein the metal atom bears a —NR"$_2$ ligand are disclosed i.a. in WO-A-98/56831 and WO-A-00/34341. The contents of the above documents are incorporated herein by reference. Further metallocenes are described e.g. in EPA-260 130. Further examples of usable metallocenes may also be found e.g. from WO-A-97/28170, WO-A-98/46616, WO-A-98/49208, WO-A-99/12981, WO-A-99/19335, WO-A-98/56831, WO-A-00/34341, EP-A-423 101 and EP-A-537 130 as well as V. C. Gibson et al., in Angew. Chem. Int. Ed., engl., Vol 38, 1999, pp 428-447 and V. C. Gibson and S. K. Spitzmesser, in Chem. Rev. 2003; 103(1); pp 283-316, the disclosures of which are incorporated herein by reference.

Alternatively, in a further subgroup of the metallocene compounds, the metal bears a Cp group as defined above and additionally a $\eta^1$ or $\eta^2$ ligand, wherein said ligands may or may not be bridged to each other. This subgroup includes so called "scorpionate compounds" (with constrained geometry) in which the metal is complexed by a $\eta^5$ ligand bridged to a $\eta^1$ or $\eta^2$ ligand, preferably $\eta^1$ (for example a sigma-bonded) ligand, e.g. a metal complex of a Cp group as defined above, e.g. a cyclopentadienyl group, which bears, via a bridge member, an acyclic or cyclic group containing at least one heteroatom, e.g. —NR"$_2$ as defined above. Such compounds are described e.g. in WO-A-96/13529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the organotransition metal compounds of formula (II) usable in the present invention is known as non-metallocenes wherein the transition metal (preferably a Group 4 to 6 transition metal, suitably Ti, Zr or Hf) has a coordination ligand other than cyclopentadienyl ligand.

The term "non-metallocene" herein means compounds, which bear no cyclopentadienyl ligands or fused derivatives thereof, but one or more non-cyclopentadienyl η- or σ-, mono-, bi- or multidentate ligand. Such ligands can be chosen e.g. from (a) acyclic, $\eta^1$- to $\eta^4$- or $\eta^6$-ligands composed of atoms from Groups 13 to 16 of the Periodic Table (IUPAC), e.g. an acyclic pentadienyl ligand wherein the chain consists of carbon atoms and optionally one or more heteroatoms from Groups 13 to 16 (IUPAC), and in which the open chain ligand may be fused with one or two, preferably two, aromatic or non-aromatic rings and/or bear further substituents (see e.g. WO 01/70395, WO 97/10248 and WO 99/41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99/10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02/060963). As examples of such compounds, i.a. transition metal complexes with nitrogen-based, cyclic or acyclic aliphatic or aromatic ligands, e.g. such as those described in the applicants earlier application WO-A-99/10353 or in the Review of V. C. Gibson at al., in Angew. Chem. Int. Ed., engl., Vol 38, 1999, pp 428-447 and V. C. Gibson and S. K. Spitzmesser, in Chem. Rev. 2003; 103(1); pp 283-316 or with oxygen-based ligands, such as Group 4 metal complexes bearing bidentate cyclic or acyclic aliphatic or aromatic alkoxide ligands, e.g. optionally substituted, bridged bisphenolic ligands (see i.a. the above review of Gibson et al.). Further specific examples of non-$\eta^5$ ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference. It should be noted that the diversity does not affect the applicability of the process of the invention.

Specific examples of metallocenes suitable for use in the present invention include racemic-dimethylsilyl bis(2-methyl-4-phenylindenyl)zirconium dichloride, racemic-dimethylsilyl bis(2-methyl-indenyl)zirconium dichloride, racemic-dimethylsilyl bis(2-methyl-4,5-benzoindenyl) zirconium dichloride, racemic-isopropylidene bis(2,3 dimethylcyclopentadienyl)zirconium dimethyl, racemic isopropylidene bis(2,4 dimethylcyclopentadienyl)zirconium dimethyl, ethylene bis(indenyl)zirconium dimethyl, and the corresponding dichlorides. Other metallocenes include ethylene bis(2-methyl indenyl)zirconium dichloride, diphenyl silyl bis(2-methyl indenyl)zirconium dichloride, diphenyl silyl bis(2-methyl, 4-phenyl-indenyl)zirconium dichloride, and diethyl silyl bis(2-methyl, 4-phenyl indenyl)zirconium dichloride.

Further suitable metallocene complexes are bis(n-butylcyclopentadienyl)Hf dibenzyl, bis(methylcyclopentadienyl)Hf dibenzyl, bis(1,2-dimethylcyclopentadienyl)Hf dibenzyl, bis(n-propylcyclopentadienyl)Hf dibenzyl, bis(i-propylcyclopentadienyl)Hf dibenzyl, bis(1,2,4-trimethylcyclopentadienyl)Zr dibenzyl, bis(tetrahydroindenyl)Zr dibenzyl, bis(n-butylcyclopentadienyl)Hf (CH2SiMe3)2, bis(n-propylcyclopentadienyl)Hf (CH2SiMe3)2, bis(i- propylcyclopentadienyl)Hf (CH2SiMe3)2, bis(1,2,4-trimethyl-cyclo-pentadienyl)-Zr (CH2SiMe3)2.

Such suitable metallocene are, for example, described, among others, in EP 629631, EP 629632, WO 00/26266, WO 02/002576, WO 02/002575, WO 99/12943, WO 98/40331, EP 776913, EP 1074557 and WO 99/42497 as well as in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The preparation of metallocenes and non-metallocenes, and the organic ligands thereof, usable in the invention is well documented in the prior art, for example in WO 01/48034, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand (η-ligand) with a transition metal. Alternatively, a metal ion of an existing metallocene can be exchanged for another metal ion through transmetallation.

If several different transition metal compounds are used (mixed dual or multicatalyst systems), these can be any combinations of the above organometal compounds or of the above organometal compounds with other catalyst compounds (including Ziegler-Natta and chromium oxide systems), e.g. a combination at least of two or more a metallocenes, of a metallocene and a non-metallocene, as well as of a metallocene and/or a non-metallocene with a Ziegler-Natta catalyst system (which comprises typically a transition metal compound and a compound of a metal from Group 2 of the Periodic Table, such as a Mg compound).

As a further requirement the catalyst system according to the present invention contains a cocatalyst comprising an element of group 13 of the Periodic Table (IUPAC 2007). Thus the cocatalyst comprises for instance aluminium (Al) or boron (B). Preferably the cocatalyst comprises a compound of Al.

Examples of such cocatalysts are organo aluminium compounds, such as trialkyl aluminium compounds and/or aluminoxane compound.

Preferred as cocatalysts are aluminoxanes, in particular $C_1$-$C_{10}$-alkyl aluminoxanes, most particularly methyl aluminoxane (MAO). Such aluminoxanes can be used as the sole cocatalyst or together with other cocatalyst(s). Thus besides or in addition to aluminoxanes, other cation complex forming catalysts activators can be used. Said cocatalysts are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such cocatalysts are within the skills of an expert in the field. As an example, with the boron activators, 5:1 to 1:5, preferably 2:1 to 1:2, such as 1:1, ratio of the transition metal to boron cocatalyst may be used. In case of preferred aluminoxanes, such as methyl aluminoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

As already stated above the catalyst system compounds, i.e. the organometallic compound of a transition metal of Group 3 to 10 of the Periodic Table (IUPAC 2007) and the cocatalyst are dissolved in the solvent (A-1). Preferably the solvent (A-1) is an organic solvent (A-1). More preferably the organic solvent (A-1) is selected from the group consisting of a linear alkane, cyclic alkane, linear alkene, cyclic alkene, aromatic hydrocarbon, like toluene, benzene, ethylbenzene, propylebenzene, butylbenzene and/or xylene, and halogen-containing hydrocarbons. Toluene is particular preferred as solvent (A-1) to form the solution (A) with the components of the catalyst system.

In step b) the solution (A) of the catalyst components, i.e. the organometallic compound of a transition metal of Group 3 to 10 of the Periodic Table (IUPAC 2007) and the cocatalyst, is dispersed in a solvent (B) to form an emulsion.

Suitable processes for dispersing the solution (A) within the solvent (B) to form an emulsion is the use of a mechanical device as well as the use of ultrasound for mixing or by the so called phase change method as described in WO 03/051934 and as known to the skilled person. The process parameters, such as time of mixing, intensity of mixing, type of mixing, power employed for mixing, such as mixer velocity or wavelength of ultrasound employed, viscosity of solvent phase, are used for adjusting the particle size of the catalyst system.

A surfactant is used for stabilizing the emulsion. According to the invention a polystyrene-b-fluoro polystyrene copolymer of the formula (I)

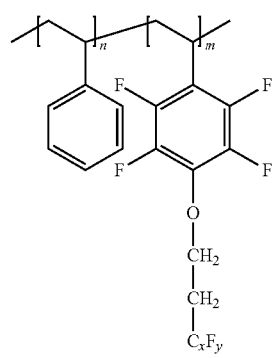

In which n is a number from 10 to 100, preferably 25 to 90, more preferably 35 to 80 and most preferably 45 to 75,
m is a number from 1 to 40, preferably from 3 to 30, more preferably 5 to 25 and most preferably 8 to 20,
x is a number from 5 to 16, preferably 6 to 12, more preferably 7 to 9 and most preferably 8,
y is a number from 11 to 33, preferably 13 to 25, more preferably 15 to 20 and most preferably 17,
provided that m, n, x and y are selected in a way that the block copolymer is soluble in the solvent B or the solution A in such an extent that a stable emulsion is formed by adding the block copolymer,
is used as surfactant.

With the parameters n, m, x and y an art skilled person easily can calculate other important parameters, like the molecular weight, the block ratio, the F mol fraction and elemental F(%).

A further parameter for characterizing the copolymers of the formula (I) is the polydispersity index (PDI=Mw/Mn), which is determined by GPC.

Preferably the copolymers of the formula (I) according to the invention have a PDI from 1.1 to 2, more preferably 1.2 to 1.8 and most preferably 1.3 to 1.6.

Such surfactants can be prepared by living/controlled polymerization techniques, as known to art skilled persons. Preferably the surfactants used according to the invention are prepared by ATRP (atom transfer radical polymerization).

The surfactant is added to form an emulsion in an amount of 0.1 wt % to 5 wt % in respect of the amount of dispersed phase, preferably 0.2 to 4 wt %, more preferably 0.3 to 3 wt % and most preferably 0.4 to 2 wt % in respect of the amount of dispersed phase.

Less than 0.1 wt % of the surfactant in respect of the amount of dispersed phase will have a negative effect on morphology.

More than 5 wt % of the surfactant in respect of the amount of dispersed phase can be added, as long as sufficient solubility of the surfactant is given.

After the formation of the emulsion system, said catalyst is formed in situ from the catalyst components in said solution.

In principle any solidification method can be used for forming the solid catalyst system from the dispersed droplets. According to one preferred embodiment the solidification is effected by a temperature change treatment. Hence the emulsion is subjected to a gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered solid catalyst system has preferably an average size range of 5 to 200 µm, more preferably 10 to 100 µm.

Moreover, the form of solidified catalyst system has preferably a spherical shape, a predetermined particles size distribution and a surface area of preferably less than 25 m²/g, still more preferably less than 20 m²/g, yet more preferably less than 15 m²/g, yet still more preferably less than 10 m²/g and most preferably less than 5 m²/g, wherein said particles are obtained by the process as described above.

For further details, embodiments and examples of the continuous and dispersed phase system, emulsion formation method and solidification methods reference is made e.g. to the above cited international patent application WO 03/051934.

The above described catalyst components are prepared according to the methods described in WO 01/48034.

The reaction steps b) and c) may be carried out batch wise or at least one of steps (b) to (c) of the above catalyst preparation process can be carried out in a continuous, rather than in a batch wise manner.

Details, embodiments and examples for the semi-continuous or continuous process for steps b) and c) are described for example in WO 2006/069733, the contents of which are incorporated herein by reference.

The present invention is further related to the use of the above defined catalyst system for olefin polymerization to yield polyolefins and the polyolefins produced with such a catalyst system.

Suitable polyolefins comprise polyethylene and polypropylene homopolymers, and also polyethylene, polypropylene and polypropylene/ethylene copolymers comprising from 0 to 40 wt % of $C_2$-olefin or $C_3$ to $C_{30}$-alpha-olefin or $C_4$ to $C_{30}$-diene-derived units, and more particularly a copolymer or terpolymer of ethylene and/or propylene with 0 to 10 wt % alkenes, for example ethylene, 1-propene, 1-butene, 1-pentene, 4-methyl-pent-1-ene, 1-hexene, cyclohexene, 1-octene and norbornene, or dienes, for example butadiene, hexadiene or octadiene.

In a preferred embodiment the polyolefins produced by using the catalyst according to the invention are propylene polymers.

The polypropylene produced can be unimodal or multimodal, more preferably bimodal. "Multimodal" or "multimodal distribution" describes a frequency distribution that has several relative maxima (contrary to unimodal having only one maximum). In particular, the expression "modality of a polymer" refers to the form of its molecular weight distribution (MWD) curve, i.e. the appearance of the graph of the polymer weight fraction as a function of its molecular weight. If the polymer is produced in a sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

The polypropylene can furthermore be a homopolymer or a copolymer. In case the polypropylene is unimodal the polypropylene is preferably a polypropylene homopolymer. In turn in case the polypropylene is multimodal, more preferably bimodal, the polypropylene can be a polypropylene homopolymer as well as a polypropylene copolymer.

The expression polypropylene homopolymer as used in this invention relates to a polypropylene that consists substantially, i.e. of at least 97 wt %, preferably of at least 99 wt %, and most preferably of at least 99.8 wt % of propylene units. In a preferred embodiment only propylene units in the polypropylene homopolymer are detectable. The comonomer content can be determined with FT infrared spectroscopy.

In case the polypropylene is a multimodal or bimodal polypropylene copolymer, it is preferred that the comonomer is ethylene. However, also other comonomers of higher olefins, like $C_4$-$C_{10}$ known in the art are suitable. Preferably, the total amount of comonomer, more preferably ethylene, in the propylene copolymer is up to 30 wt %, more preferably up to 25 wt %.

In addition, the present invention is related to the process for producing the polyolefins, whereby the catalyst system as defined above is employed.

Any method of olefin polymerization—for example, a gas phase, slurry phase, solution polymerization process or any combinations thereof—that is known for the polymerization of olefins to form polyolefins in combination with the catalysts system of the invention can be used.

Polymerization can be a one stage or a two or multistage polymerization process, carried out in at least one polymerization reactor. Multimodal polymers with respect to the molecular weight distribution (MWD) are produced in a multistage process, where low molecular weight and higher molecular weight polymers are produced in different polymerization steps, in any order. Different combinations for producing multimodal polymers can be used, e.g. gas-gas phase, slurry-slurry phase, slurry-gas phase processes; slurry-gas phase polymerization being a preferred one. Unimodal polymers can be produced in a one stage polymerization, although more than one stage is possible, but then polymers with approximately the same molecular weight are produced in each stage. Any type of polymerizations as listed above are possible, however, slurry process being one preferred process.

In addition to the actual polymerization the process configuration can comprise any pre- or post reactors.

The catalyst system according to the invention may be introduced into the polymerization reactor by any suitable means regardless of the type of polymerization reactor used. In one embodiment, the catalyst system is fed to the reactor in a substantially dry state, meaning that the isolated solid form of the catalyst has not been diluted or combined with a diluent prior to entering the reactor. In another embodiment, the catalyst system is combined with a diluent and fed to the reactor; the diluent in one embodiment is an alkane, such as a $C_4$ to $C_{20}$-alkane, or fluorinated hydrocarbon, mineral or silicon oil, or combinations thereof (note, this US is for ZN)

Generally the quantity of catalyst system used will depend upon the nature of the catalyst system, the reactor types and conditions and the properties desired for the polymer product. Conventional catalyst quantities, such as described in the publications referred herein, may be used.

The reactor setup is not particularly limited and can be any reactor setup known to the skilled person.

For slurry reactors, e.g. loop reactors, the reaction temperature will generally be in the range of 50 to 110° C. (e.g. 60-100, or 70 to 110° C.), the reactor pressure will generally be in the range of 20 to 80 bar (e.g. 30-70 bar), and the residence time will generally be in the range of 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions.

For gas phase reactors, the reaction temperature used will generally be in the range of 50 to 130° C. (e.g. 60 to 115° C., or 60 to 100° C.), the reactor pressure will generally be in the range of 5 to 60 bar, preferably 10 to 40 bar and the residence time will generally be 1 to 8 hours. The gas used will commonly be monomer or a mixture of monomer and a non-reactive gas such as nitrogen. In polypropylene polymerization the gas is mainly of monomer.

Hydrogen may be introduced into a reactor to control the molecular weight of the polymer as is well-known and routine in the art. In one embodiment, the mole ratio of hydrogen to total olefin monomer in the circulating gas stream is in a range of from 0.001 or 0.002 or 0.003 to 0.014 or 0.016 or 0.018 or 0.024, wherein a desirable range may comprise any combination of any upper mole ratio limit with any lower mole ratio limit described herein. Expressed another way, the amount of hydrogen in the reactor at any time may range from 1000 ppm to 20,000 ppm in one embodiment, and from 2000 to 10,000 in another embodiment, and from 3000 to 8,000 in yet another embodiment, and from 4000 to 7000 in yet another embodiment, wherein a desirable range may comprise any upper hydrogen limit with any lower hydrogen limit described herein.

The invention therefore also provides a process for producing a polymer composition comprising at least (i) an alpha-olefin homo- or copolymer component as defined above, wherein alpha-olefin monomers, optionally together with one or more comonomers, are polymerized in the presence of the special catalyst system according to the invention.

In case the polymer composition consists of component (i) the process is a single stage process.

The invention further provides a process for producing a polymer composition comprising at least two different alpha-olefin homo- or copolymer components (i) and (ii) as defined above or in claims below, wherein each component is produced by polymerizing alpha-olefin monomers, optionally together with one or more comonomers, in the presence of the polymerization catalyst system according to the invention in a multistage polymerization process using one or more polymerization reactors, which may be the same or different, e.g. at least loop-loop, gas-gas or any combination of loop and gas. Each stage may be effected in parallel or sequentially using same or different polymerization method. In case of a sequential stages each components, e.g. (i) and (ii), may be produced in any order by carrying out the polymerization in each step, except the first step, in the presence of the polymer component formed, and preferably the catalyst system used, in the preceding step. Alternatively, the same or different catalyst system can be added in the subsequent step(s).

In one embodiment the process for producing any of the above polymer composition comprising (i) an alpha-olefin homopolymer or copolymer component and, optionally, (ii) an alpha-olefin homopolymer or copolymer component includes the steps of:

(a) polymerizing in a slurry reactor zone, preferably a loop reactor, alpha-olefin monomers, optionally together with one of more comonomers, in the presence of the catalyst system according to the invention to produce polymer component (i), and (b) optionally transferring the reaction product of step (a) to a subsequent gas phase reactor zone and polymerizing alpha-olefin monomers, optionally together with one or more comonomers, in the presence of the reaction product of step (a) to produce polymer component (ii) for obtaining the polymer composition, and (c) recovering the obtained composition.

A preferred multistage process is a "loop-gas phase"-process, such as developed by Borealis A/S, Denmark (known as BORSTAR® technology) described e.g. in patent literature, such as in EP 0887 379, in WO92/12182 or in WO 2005/002744.

The polymer compositions produced according to the invention can be used for a great variety of applications, like for example for blown films, pipe, extrusion coating, wire and cable jacketing, injection moulding, blow moulding or roto-moulding.

Methods:

GPC: Molecular Weight Averages, Molecular Weight Distribution, and Polydispersity Index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2× GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling in into the GPC instrument.

The bulk density of the polymer powder was determined according to ASTM D 1895.

Al and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 20 ppm Zr in a solution of 5% $HNO_3$, 3% HF in DI water) and a quality control sample (20 ppm Al, 10 ppm Zr in a solution of 5% $HNO_3$, 3% HF in DI water). The content of zirconium was monitored using the 339.198 nm line, the content of aluminium via the 396.152 nm line and the potassium using the 766.490 nm line. The reported values, required to be between 0 and 100, or further dilution is required, are an average of three successive aliquots taken from the same sample and are related back to the original catalyst using equation 1.

$$C = \frac{R \times V}{M} \qquad \text{Equation 1}$$

Where:
C is the concentration in ppm, related to % content by a factor of 10,000
R is the reported value from the ICP-AES
V is the total volume of dilution in ml
M is the original mass of sample in g If dilution was required then this also needs to be taken into account by multiplication of C by the dilution factor.

The catalyst activity is defined as the amount of polymer in kilograms obtained per gram solid catalytic component used and per hour (e.g. kg PP/g catalyst/h).

PSD

Particle Size Distribution, PSD: Measured by Coulter Counter LS 200 at room temperature with n-heptane as medium.

EXPERIMENTAL PART

Example 1

Synthesis of FSF monomer

Synthesis of 2,3,5,6-tetrafluoro-4-(3,3,4,4,5,5,6,6,7,7,8,8,9,9,10,10,10-heptadecafluoro-decaoxy)styrene (FSF) was as follows:

1H,1H,2H,2H-perfluorodecanol (16 mmol, Fluka) was mixed with 32 ml of 50% aqueous NaOH. Amounts of 32 ml dichloromethane and 1.6 mmol tetrabutylammonium hydrogen sulphate (TBAH, Fluka, >99%) were added, and the resulting suspension was vigorously stirred. Upon addition of pentafluorostyrene (18 mmol; FS, Aldrich Chemicals, 99%, vacuum distilled to remove stabilizers), the reaction mixture turned slightly yellow. After stirring for 72 h at 40° C., the organic layer was separated and washed with 0.1 M HCl and with water and dried over sodium sulphate. After evaporating of solvent the product was crystallized in methanol. Yield was 30%.

1H NMR (200 MHz, $CDCl_3$) δ ppm: 2.6 (2H, —$OCH_2CH_2C_8F_{17}$), 4.45 (2H, —$OCH_2CH_2C_8F_{17}$), 5.7 (1H, —CH=$CH_{(1)}$), 6.05 (1H, —CH=$CH_{(2)}$), 6.65 (1H, —CH=$CH_2$).

Example 2

General ATRP Procedure for Macroinitiators

Bromine terminated polystyrene, PS—Br, macroinitiator was prepared as follows:

A solution in 5 ml of xylene of 14.6 g styrene (Merck, vacuum distilled before use), 0.32 g phenyl-2-bromopropionate (synthesized as described in Macromulecules, 1999; 32: pp 8732-9 by Haddleton and Waterson using phenol (Merck, 99.5%) and 2-bromopropionyl bromide (Aldrich Chemicals, 98%)), 0.20 g Cu(I)Br (washed with glacial acetic acid, AppliChem, 96%), and 0.44 g bipyridine was prepared in a round bottomed flask (molar ratio monomer:initiator:Cu (I)Br:ligand of 100:1:1:2). The solution was degassed by five freeze-thaw cycles and the sealed polymerization mixture was immersed into a silicon oil bath at 110° C. After 135 minutes reaction time the mixture was cooled down to ambient temperature, diluted with THF and filtered through silica and $Al_2O_3$ column. 8.6 g of the macroinitiator was obtained after filtering, precipitation of the polymer in methanol, and drying under vacuum. The purity of the sample was ascertained by $^1$H NMR spectroscopy and SEC against PS standards were used in the calculation of molar mass and molar mass distribution.

Molecular Characteristics:
Mn: 3877 g/mol
Mw: 5300 g/mol,
PDI: 1.37

Example 3

Procedure for ATRP of the Fluorinated Monomers; Preparation of $PS_{4000}$-b-PF C8F17

A solution in 5 ml of xylene of 3.3 g FSF (monomer, as prepared in Example 1), 0.90 g macroinitiator (bromine terminated polystyrene; as prepared in Example 2), 0.024 g Cu(I)Br and 0.053 bipyridine was prepared in a round bottomed flask (molar ratio monomer:initiator:Cu(I)Br:ligand of 30:1:1:2). The solution was degassed by five freeze-thaw cycles and the sealed polymerization mixture was immersed into a silicon oil bath at 110° C. After 18 h reaction time the mixture was cooled down to ambient temperature, diluted with THF and filtered through silica and $Al_2O_3$ column. After filtering the polymer was precipitated in methanol and dried under vacuum, resulting in 2.6 g of PS4000-b-PFSC8F17 in form of a white powder. The purity of the samples was ascertained by $^1$H NMR spectroscopy. The molar masses were determined from the $^1$H NMR spectra and polydispersity from SEC.

Molecular Characteristics:
Mn: 9400 g/mol
Mw: 14500 g/mol
PDI: 1.54

Example 4

Catalyst Preparation

In a glove box, 25 mg of the polymeric surfactant was added to 5.0 ml of a 30% solution of methyl aluminoxane (Albemarle) in toluene. After stirring for 12 hours at room temperature the obtained clear solution was added to 54 mg of rac-dimethylsilylbis-(2-methyl-4-phenylindenyl)zirconium dichloride (Catalytica Advanced Technologies; CAS: 153882-67-8). The mixture was then stirred for 30 minutes at room temperature.

The obtained redish solution was added to 40 mL of perfluoro-1,3-dimethylcyclohexane in a 50 mL emulsification glass reactor equipped with baffles and an overhead stirrer at 0° C. The reaction mixture was stirred at 0° C. and 570 rpm for 20 minutes, resulting in an emulsion with the toluene solution as the dispersed phase.

In the meantime, 100 mL of perfluoro-1,3-dimethylcyclohexane was heated in a second glass reactor equipped with an mechanical stirrer in an oil bath to 90° C. Mixing was adjusted to 400 rpm. The cold emulsion was then transferred via a teflon tube (inner diameter 2 mm) as fast as possible to the hot perfluoro-1,3-dimethylcyclohexane. The oil bath was removed, and stirring of the obtained suspension was continued at 300 rpm for 15 minutes.

Mixing was then stopped, causing the solid catalyst to float on the perfluoro-1,3-dimethylcyclohexane. After removal of the perfluoro hydrocarbon by siphonation, the remaining solid catalyst was dried for 2 hours at 50° C. in an Argon flow, resulting in 0.97 g of catalyst in form of a red, free flowing powder.

Molar ratio Al/Zr=200
Surfactant amount in the dispersed phase: 0.5 wt %
Catalyst:
Zr content in catalyst: 0.50 wt %
Particle size: d50=16.2 µm In FIG. 1 scanning electron microscopy (SEM) images of the catalyst according to Example 4 are shown. These images show the good catalyst morphology for the catalyst according to the invention (Example 4).

Example 5

Catalyst Preparation

Example 4 was repeated except that the amount of the surfactant in the dispersed phase was 1.5 wt %.

Yield: 0.95 g of catalyst
Molar ratio Al/Zr=200
Catalyst:
Zr content in catalyst: 0.49 wt %
Particle size: d50=13.5 µm In FIG. 2 scanning electron microscopy (SEM) images of the catalyst according to Example 5 are shown. These images show the good catalyst morphology for the catalyst according to the invention (Example 5).

Figure 2:
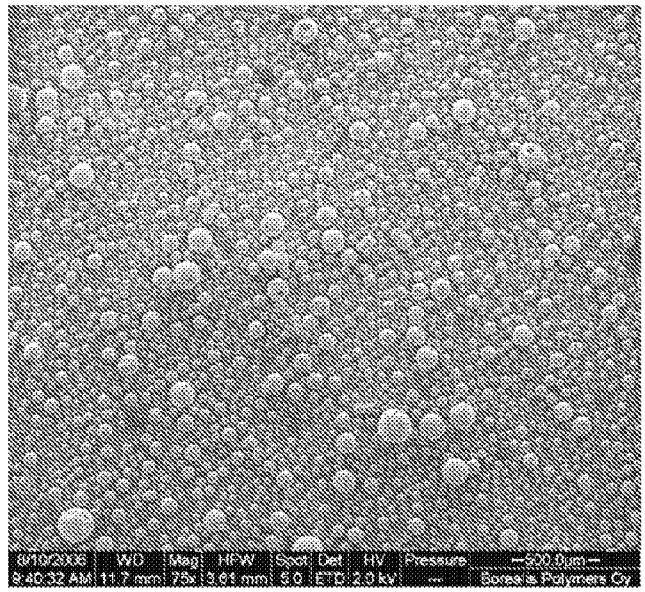
Figure 2:
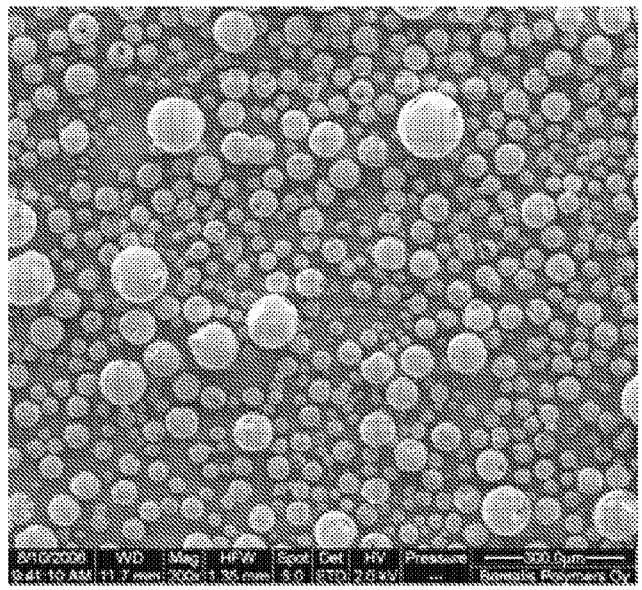

As can be seen in FIG. 2 particle morphology is significantly improved with higher surfactant concentration.

Example 6

Polymerization

Liquid propylene (1400 g), triisobutylaluminium solution (0.25 mL TIBA in 5 mL of pentane) and hydrogen (20 mmol) were introduced to a 5-L stainless steel reactor. Temperature of the reactor was stabilised to 30° C. and 21.8 mg of the solid catalyst prepared in example 4 was flushed to the reactor with PFC (5 mL) and nitrogen overpressure. Stirring was set to 250 rpm. Reactor temperature was increased to 70° C. in 15 min after which the polymerization reaction was continued for 30 min. Then, the reactor was degassed, flushed with nitrogen, and opened. The polypropylene yield was 241.0 g. The catalyst activity was 22.1 kg PP/gcat·h. $MFR_2$=7.8 g/10 min.

Example 7

Polymerization

Polymerization procedure of example 6 was repeated, but catalyst prepared in example 5 was used. The polypropylene yield was 366.0 g. The catalyst activity was 33.6 kg PP/gcat·h. $MFR_2$=7.4 g/10 min.

Example 8

Comparative Example 1

Catalyst Preparation

In a jacketed 90 dm³ glass-lined stainless steel reactor the complex solution was prepared at −5° C. adding 1.26 kg of a 24.5 wt % ((2,2,3,3,4,4,5,5,6,6,7,7,8,8,9,9,9-heptadecafluorononyl)oxirane)/toluene solution very slowly (3.4 ml/min) to 20 kg 30 wt.-% methylaluminoxane/toluene solution. The temperature was increased to 25° C. and the solution was stirred for 60 minutes. After addition of 242 g of the complex rac-dimethylsilanediylbis(2-methyl-4-phenylindenyl)zirconium dichloride the solution was stirred for an additional two hours. That mixture was pumped at 5 l/h to the rotor stator with the rotor stator pair 4M. In the rotor stator with a tip speed of 4 m/s the mixture was mixed with a flow of 32 l/h of PFC thus forming an emulsion. The droplets in the emulsion were solidified by an excess flow of 450 l/h PFC at a temperature of 76° C. in a Teflon hose. The hose was connected to a jacketed 160 dm³ stainless steel reactor equipped with a helical mixing element. In this reactor the catalyst particles were separated from the PFC by density difference. After the complex solution had been utilized the catalyst particles were dried in the 160 dm³ reactor at a temperature of 70° C. and a nitrogen flow of 5 kg/h for 5 h.

Particle mean size d50: 16 µm
Molar ratio Al/Zr 230 mol/mol
Zr content: 0.49 wt-%
Al content: 34.4 wt-%

Example 9

Comparative Example 2

Polymerization

Polymerization was carried in the same manner as in example 6 using 33.8 mg of the catalyst as prepared in example 8. The polypropylene yield was 157 g. The catalyst activity was 9.3 kg PP/gcat·h. $MFR_2$=21.6 g/10 min.

The invention claimed is:
1. Process for the preparation of an unsupported, heterogeneous olefin polymerization catalyst system, comprising an organometallic compound of a transition metal of Group 3 to 10 of the Periodic Table (IUPAC 2007) in the form of solid particles comprising the steps of:
a) preparing a solution (A) comprising:
   $a_1$) an organometallic compound of a transition metal of Group 3 to 10 of the Periodic Table (IUPAC 2007) or of an actinide or lanthanide,
   $a_2$) a cocatalyst comprising an element of group 13 of the Periodic Table (IUPAC 2007) and
   $a_3$) a solvent (A-1),
b) preparing a liquid/liquid emulsion system by dispersing the solution (A) in a solvent (B) essentially immiscible with said solution (A) in the presence of a polystyrene-b-(fluoro polystyrene) copolymer of the formula (I):

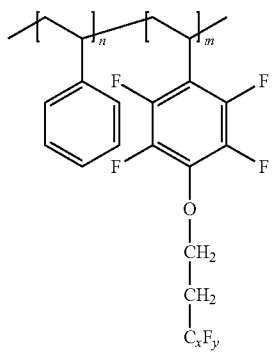

in which n is a number from 10 to 100,
m is a number from 1 to 40,
x is a number from 5 to 16,
y is a number from 11 to 33, provided that m, n, x and y are selected in a way that the polystyrene-b-(fluoro polystyrene) copolymer is soluble in the solvent B or the solution A in such an extent that a stable emulsion is formed by adding the polystyrene-b-(fluoro polystyrene) copolymer,
$b_1$) the solvent (B) constitutes the continuous phase of the emulsion,
$b_2$) the solution (A) constitutes in the form of droplets in the dispersed phase and
$b_3$) the organometallic compound and the cocatalyst are present in the droplets,
c) solidifying said dispersed phase to convert said droplets to solid particles and
d) optionally recovering said particles to obtain said catalyst system.

2. A process according claim 1, characterized in that the polystyrene-b-(fluoro polystyrene) copolymer of the formula (I) is used as surfactant, wherein the formula (I):
n is a number from 25 to 90,
m is a number from 3 to 30,
x is a number from 6 to 12, and
y is a number from 13 to 25,
provided that m, n, x and y are selected in a way that the block copolymer is soluble in the solvent B or the solution A in such an extent that a stable emulsion is formed.

3. A process according claim 1, characterized in that the polystyrene-b-(fluoro polystyrene) copolymer of the formula (I) is used as surfactant, wherein the formula (I):
n is a number from 35 to 80,
m is a number from 5 to 25,
x is a number from 7 to 9, and
y is a number from 15 to 20,
provided that m, n, x and y are selected in a way that the block copolymer is soluble in the solvent B or the solution A in such an extent that a stable emulsion is formed by adding the block copolymer.

4. A process according to claim 1, characterized in that the polystyrene-b-(fluoro polystyrene) copolymer of the formula (I) has a polydispersity index, determined by GPC from 1.1 to 2.

5. A process according to claim 1, characterized in that the amount of surfactant added to form an emulsion is 0.1 wt % to 5 wt % in respect of the amount of dispersed phase.

6. A process according to claim 1, characterized in that the polystyrene-b-(fluoro polystyrene) copolymer of the formula (I) is prepared by a living/controlled polymerization techniques, by ATRP (atom transfer radical polymerization).

7. A process according to claim 6, wherein the organometallic compound of a transition metal is a metallocene compound of formula (III):

$$(Cp)_m R_n TA_q \quad (III),$$

wherein each Cp independently is an unsubstituted or substituted and/or fused homo- or heterocyclopentadienyl ligand; the optional one or more substituent(s) being selected from halogen, C1-C20-alkyl, C2-C20-alkenyl, C2-C20-alkynyl, C3-C12-cycloalkyl, C6-C20-aryl or C7-C20-arylalkyl, C3-C12-cycloalkyl which contains 1, 2, 3 or 4 heteroatom(s) in the ring moiety, C6-C20-heteroaryl, C1-C20-haloalkyl, —SiR"$_3$, —OSiR", —SR", —PR"$_2$ or —NR"$_2$, each R" is independently a hydrogen or C1-C20-alkyl, C2-C20-alkenyl, C2-C20-alkynyl, C3-C12-cycloalkyl or C6-C20-aryl; or in case of —NR"$_2$, the two substituents R" can form a ring together with the nitrogen atom wherein they are attached to,
R is a bridge of 1-7 atoms and 0-4 heteroatoms, wherein the heteroatom(s) can be Si, Ge and/or O atom(s), wherein each of the bridge atoms bears independently substituents selected from C1-C20-alkyl, tri(C1-C20-alkyl)silyl, tri(C1-C20-alkyl)siloxy or C6-C20-aryl substituents; or a bridge of 1-3 hetero atoms selected from silicon, germanium and/or oxygen atom(s),
T is a transition metal selected from Ti, Zr or Hf, each A is independently H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"3, —SiR"3, —OSiR"3 or —NR"2; each R" is independently hydrogen or C1-C20-alkyl, C2-C20-alkenyl, C2-C20-alkynyl, C3-C12-cycloalkyl or C6-C20-aryl; or in case of —NR"2, the two substituents R" can form a ring, together with the nitrogen atom wherein they are attached to,
n is 0 or 1,
m is 1 or 2,
q is 2 or 3, wherein m+q is equal to the valency of T.

8. A process according to claim 1 wherein the cocatalyst is a trialkyl aluminium compound and/or an aluminoxane compound selected from $C_1$-$C_{10}$-alkyl aluminoxanes, which can be used as the sole cocatalyst or together with other cocatalyst(s).

9. A process according to claim 1, wherein the solvent (A-1) used in step a) to form the solution A is selected from the group consisting of toluene, benzene, xylenes, ethylbenzene, cumene mesitylene or cymene.

10. A process according to claim 9, wherein the solvent (A-1) used in step a) is toluene.

11. A process according to claim 1, wherein in step b) said essential immiscible solvent which forms the continuous phase comprises a fluorinated hydrocarbon.

12. A process according to claim 1, wherein in step c) the solidification is effected by a temperature change treatment.

13. An unsupported, heterogeneous olefin polymerization catalyst, obtainable by the process as claimed in claim 1.

14. A process for the preparation of polyolefins comprising polymerizing at least one olefin monomer in the presence of an olefin polymerization catalyst as claimed in claim 13.

* * * * *